United States Patent
Lo et al.

(10) Patent No.: US 7,808,249 B1
(45) Date of Patent: Oct. 5, 2010

(54) METHODS AND APPARATUS FOR MEASURING A LENGTH OF A CABLE

(75) Inventors: William Lo, Cupertino, CA (US); Tak-Lap Tsui, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 260 days.

(21) Appl. No.: 12/035,816

(22) Filed: Feb. 22, 2008

Related U.S. Application Data (60) Provisional application No. 60/891,114, filed on Feb. 22, 2007.

(51) Int. Cl.
G01R 31/11 (2006.01)
(52) U.S. Cl. .................. 324/543; 324/534; 324/535
(58) Field of Classification Search .................. 324/539, 324/543, 532, 533, 535, 699
See application file for complete search history.

(56) References Cited

U.S. PATENT DOCUMENTS

| | | | |
|---|---|---|---|
| 4,914,394 A | 4/1990 | Meyer | |
| 5,420,512 A | 5/1995 | Spillane et al. | |
| 5,461,318 A | 10/1995 | Borchert et al. | |
| 5,559,427 A | 9/1996 | Hinds et al. | |
| 5,629,628 A | 5/1997 | Hinds et al. | |
| 6,138,080 A | 10/2000 | Richardson | |
| 6,177,801 B1 | 1/2001 | Chong | |
| 6,198,727 B1 | 3/2001 | Wakeley et al. | |
| 6,341,358 B1 | 1/2002 | Bagg et al. | |
| 6,377,640 B2 | 4/2002 | Trans | |
| 6,417,672 B1 | 7/2002 | Chong | |
| 6,434,716 B1 | 8/2002 | Johnson et al. | |
| 6,438,163 B1 | 8/2002 | Raghavan et al. | |
| 6,448,899 B1 | 9/2002 | Thompson | |
| 6,522,152 B1 | 2/2003 | Tonti et al. | |
| 6,535,983 B1 | 3/2003 | McCormack et al. | |

(Continued)

FOREIGN PATENT DOCUMENTS

WO    WO 01/11861    2/2001

(Continued)

OTHER PUBLICATIONS

IEEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with collision detection (CSMA/CD) access method and physical layer specifications; LAN/MAN Standards Committee of the IEEE Computer Society; Mar. 8, 2002; 578 pages.

(Continued)

*Primary Examiner*—Vincent Q Nguyen (57) ABSTRACT

A physical layer (PHY) device of a network device includes a first module, a first cable-length measuring (CLM) module, and a first control module. The first module determines whether a remote PHY that communicates with the PHY device over a cable is capable of measuring a length of the cable. The first CLM module measures a first length of the cable. The first control module causes the first length to be transmitted to the remote PHY, receives a second length of the cable measured by the remote PHY, and adjusts an operating parameter of the PHY based on at least one of the first and second lengths.

10 Claims, 6 Drawing Sheets

U.S. PATENT DOCUMENTS

| | | |
|---|---|---|
| 6,633,166 B1 | 10/2003 | Kaiser |
| 6,694,017 B1 | 2/2004 | Takada |
| 6,728,216 B1 | 4/2004 | Sterner |
| 6,775,529 B1 | 8/2004 | Roo |
| 6,777,952 B2 | 8/2004 | Seymour |
| 6,825,672 B1 | 11/2004 | Lo |
| 6,829,223 B1 | 12/2004 | Richardson et al. |
| 6,873,827 B1 | 3/2005 | Wright |
| 6,891,803 B1 | 5/2005 | Chang et al. |
| 6,898,185 B1 | 5/2005 | Agazzi et al. |
| 6,922,060 B1 | 7/2005 | Wendel et al. |
| 6,940,289 B2 | 9/2005 | Hyacinthe et al. |
| 6,977,507 B1 | 12/2005 | Pannell et al. |
| 6,980,007 B1 | 12/2005 | Lo et al. |
| 6,982,557 B1 | 1/2006 | Lo et al. |
| 6,992,491 B1 | 1/2006 | Lo et al. |
| 6,995,551 B1 | 2/2006 | Lo et al. |
| 7,002,353 B1 | 2/2006 | Lo et al. |
| 7,005,861 B1 | 2/2006 | Lo et al. |
| 7,019,533 B1 | 3/2006 | Lo et al. |
| 7,026,825 B1 | 4/2006 | Lo et al. |
| 7,058,559 B1 | 6/2006 | Roeck et al. |
| 7,068,043 B1 | 6/2006 | Lo et al. |
| 7,068,044 B1 | 6/2006 | Lo et al. |
| 7,075,283 B1 | 7/2006 | Lo et al. |
| 7,127,481 B1 | 10/2006 | Lam |
| 7,161,911 B1 | 1/2007 | Fang et al. |
| 7,173,431 B1 | 2/2007 | Lo et al. |
| 7,190,172 B1 | 3/2007 | Lo et al. |
| 7,203,851 B1 | 4/2007 | Lo et al. |
| 7,227,889 B1 | 6/2007 | Roeck at al. |
| 7,246,368 B1 | 7/2007 | Millet et al. |
| 7,250,771 B1 | 7/2007 | Lo et al. |
| 7,276,913 B1 | 10/2007 | Lo et al. |
| 7,358,745 B1 | 4/2008 | Lo et al. |
| 7,375,532 B1 | 5/2008 | Lo at al. |
| 7,403,018 B1 | 7/2008 | Lo et al. |
| 7,576,548 B1 | 8/2009 | Lo et al. |
| 2002/0046267 A1 | 4/2002 | Andra et al. |
| 2002/0124110 A1 | 9/2002 | Tanaka |
| 2003/0204611 A1 | 10/2003 | McCosh et al. |
| 2007/0022331 A1 | 1/2007 | Jamieson et al. |
| 2007/0230555 A1 | 10/2007 | Peleg et al. |
| 2008/0265915 A1* | 10/2008 | Clark et al. .......... 324/699 |

FOREIGN PATENT DOCUMENTS

| | | |
|---|---|---|
| WO | WO 01/11861 A2 | 2/2001 |
| WO | WO 01/11861 A3 | 2/2001 |

OTHER PUBLICATIONS

IEEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with Collision Detection (CSMA/CD) access method and physical layer specifications; Section Two: This section includes Clauses 21 through 22 and Annexes 22A through 32A; LAN/MAN Standards Committee of the IEEE Computer Society; Mar. 8, 2002; 582 pages.

EEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with collision detection (CSMA/CD) access method and physical layer specifications; Section Three: This section includes Clauses 34 through 43 and Annexes 36A through 43C; LAN/MAN Standards Committee of the IEEE Computer Society; Mar. 8, 2002; 379 pages.

Gunderson, M. et al., Bipolar Nanospeed Pulse Generation Using Transmission Lines for Cell Electro-Manipulation, Conference Record of International Power Modulator Symposium, 2004, May 23-26, 2004, p. 224-227.

U.S. Appl. No. 09/991,043, filed Nov. 21, 2001, Lo, William.

U.S. Appl. No. 60/217,418, filed Jul. 11, 2000, Lam, Yat-Tung.

Intel, "LXT9784 Octal 10/100 Transceiver Hardware Integrity Function Overview" Application Note, Jan. 2001, pp. 3-14.

IEEE std. 802.3 IEEE Standard for Information technology—Telecommunications and information exchange between systems—Local and metropolitan area networks—Specific requirements; Part 3: Carrier sense multiple access with collison detection (CSMA/DC) access method and physical layer specifications, Mar. 8, 2002, pp. 1-173.

IEEE Computer Society; IEEE Standard 802.3ab; IEEE Std 802.3-2002, IEEE Standard for Information technology—Telecommunications and information exchange between systems—Local and metropolitan area networks—Specific requirements; Part 3: Carrier sense multiple access with collison detection (CSMA/DC) access method and physical layer specifications, Mar. 8, 2002, pp. 174-249 and pp. 147-173.

* cited by examiner

| Parameter | Description | Minimum | Typical | Maximum |
|---|---|---|---|---|
| $t_p$ | Link Pulse Propagation Delay | | | 1.5 us |
| $t_{sync}$ | From last link pulse to start of measurement | 17 ms – 10 us | 17 ms | 17 ms + 10 us |
| Timer1 ($t_1$) | From start to finish measuring on D | 495 us | 500 us | 505 us |
| Timer2 ($t_2$) | From start to finish measuring on B | 995 us | 1000 us | 1005 us |
| Timer3 ($t_3$) | From start to finish (A, C=normal, B, D=short) | 1495 us | 1500 us | 1505 us |
| Timer4 ($t_4$) | From start to finish measuring on C | 1995 us | 2000 us | 2005 us |
| Timer5 ($t_5$) | From start to finish measuring on A | 2495 us | 2500 us | 2505 us |
| Timer6 ($t_6$) | From start to finish B, D = normal | 2995 us | 3000 us | 3005 us |
| tm | Time to finish measurement | | | 320 us |
| tr | Time to finish short-to-normal reconfiguration | | | 320 us |

METHODS AND APPARATUS FOR MEASURING A LENGTH OF A CABLE

CROSS-REFERENCE TO RELATED APPLICATIONS

This application claims the benefit of U.S. Provisional Application No. 60/891,114, filed on Feb. 22, 2007, which is incorporated herein by reference in its entirety.

FIELD

The present disclosure relates to cable diagnostic systems, and more particularly to techniques for measuring a length of a cable.

BACKGROUND

The background description provided herein is for the purpose of generally presenting the context of the disclosure. Work of the presently named inventors, to the extent the work is described in this background section, as well as aspects of the description which may not otherwise qualify as prior art at the time of filing, are neither expressly nor impliedly admitted as prior art against the present disclosure.

Figure 1:
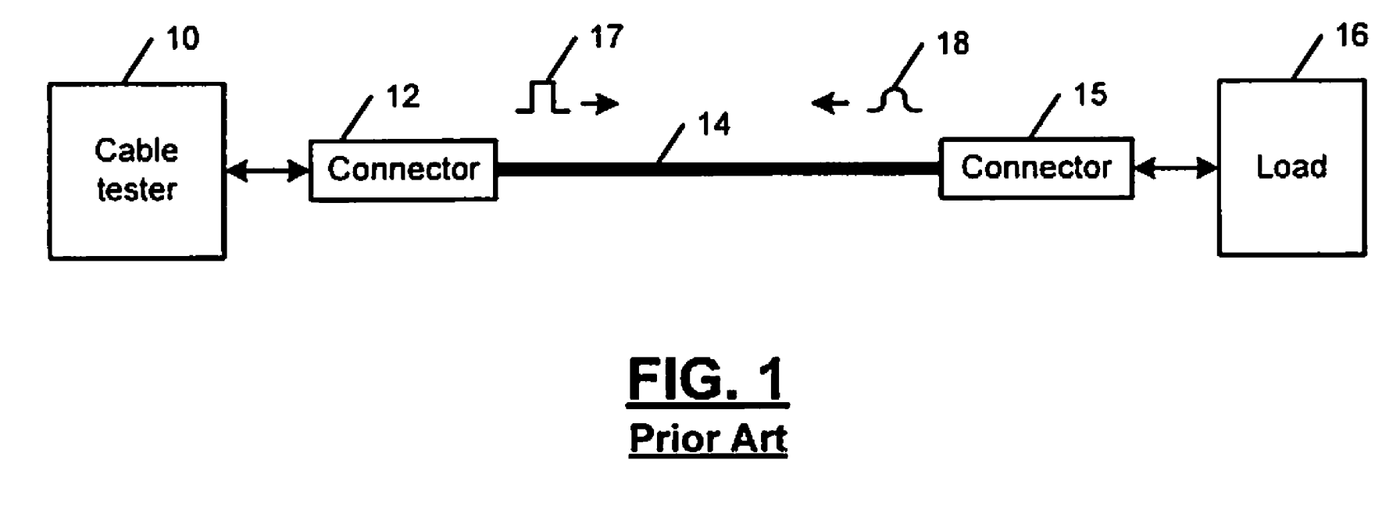
FIG. 1 is a functional block diagram of a conventional cable tester.

Referring now to FIG. 1, conventional cable testers 10 are frequently used to isolate cabling problems and to measure cable-lengths. The cable tester 10 is coupled to a cable 14 by a connector 12. The connector 12 may include an RJ-45 or other suitable connector. A connector 15 connects the cable to a load 16. The cable tester 10 typically uses a loop-back module (not shown) as the load 16 at a remote end. The cable tester 10 performs cable analysis and can detect faults—e.g., a short, an open, a crossed pair, or a reversed pair—in the cable 14. A short or an open in the cable 14 may be detected without a load. The cable tester 10 can also determine a length of the cable 14 and a distance from one end of the cable 14 to a point where the cable 14 has a fault such as a short or an open condition.

For example, in a multi-conductor cable, a short condition occurs when two or more conductors in the cable 14 are short-circuited together. An open condition occurs when one or more conductors in the cable 14 lack continuity between both ends of the cable 14. A crossed pair occurs when a pair of conductors communicates with different pins at each end of the cable 14. For example, a first pair of conductors may communicate with pins 1 and 2 at one end and pins 3 and 6 at the other end. A reversed pair occurs when two ends in a pair are connected to opposite pins at each end of the cable 14. For example, a conductor connected to pin 1 on one end communicates with pin 2 at the other end, and a conductor connected to pin 2 on one end communicates with pin 1 at the other end.

The cable tester 10 typically employs time domain reflectometry (TDR) (which is based on transmission line theory) to troubleshoot cable faults and to measure cable-lengths. In operation, the cable tester 10 transmits a test pulse 17 on the cable 14 and analyzes a corresponding reflection or a return pulse 18. Specifically, the cable tester 10 measures a difference between a time when the test pulse 17 is transmitted and a time when the return pulse 18 is received. Additionally, the cable tester 10 analyzes characteristics such as shape and size of the return pulse 18 relative to the test pulse 17. Thus, a fault in the cable 14 as well as a length of the cable 14 can be determined based on electrical properties of the cable 14 (e.g., a cable propagation constant) and the comparisons above between the test pulse 17 and the return pulse 18.

A conventional cable tester (e.g., cable tester 10), however, may generate inaccurate results when a cable is properly terminated at the remote end. For example, TDR techniques typically cannot be used to determine a length of cable when the cable is connected (at the remote end) to a link partner that is active or in use. In such a case, the cable functions as a substantially balanced transmission line when the remote end of the cable is properly terminated. With a substantially balanced transmission line, when the remote end receives a TDR pulse (e.g., test pulse 17), the remote end may return a very weak signal. Weak return signals typically cannot be analyzed unless extensive electronic circuits are used. If the cable is perfectly terminated, there may be no reflected signal. Implementing extensive electronic circuits, however, can be expensive and may not be feasible in low-cost systems.

Alternatively, digital signal processing (DSP) techniques can be used to determine a length of a cable when the cable is connected to an active link. In DSP, unlike in TDR, no pulses are injected into a cable. Instead, parameters such as amplitude, pulse width, pulse shape, etc., of signals that are normally transmitted and received on the cable are measured to determine a length of the cable (or cable-length). DSP, however, involves making some assumptions and therefore yields cable-length measurements that are approximate rather than accurate.

For example, if the length of a cable is determined based on an amplitude of a received signal, the amplitude of the transmitted signal is generally unknown or unknowable and, therefore, needs to be assumed. Additionally, any attenuation in the received signal is calculated by assuming an average attenuation per unit length of the cable. Therefore, the length of a cable determined using DSP techniques is generally an approximate estimate rather than an accurate measurement.

Thus, in low-cost systems, since TDR techniques generally cannot be used to analyze reflections from a properly terminated end or an active link, TDR techniques cannot be used to determine a cable-length although the cable may have no faults. Furthermore, while DSP techniques can be used to determine a length of a cable that is properly terminated or that is connected to an active link, DSP techniques generally cannot be used to determine an accurate cable-length when the cable is very long.

SUMMARY

A physical layer (PHY) device of a network device comprises a first module that determines whether a remote PHY that communicates with the PHY device over a cable is capable of measuring a length of the cable. A first cable-length measuring (CLM) module measures a first length of the cable. A first control module causes the first length to be transmitted to the remote PHY, receives a second length of the cable measured by the remote PHY, and adjusts an operating parameter of the PHY based on at least one of the first and second lengths.

In other feature, the operating parameter comprises a selected link speed. The first module comprises a first auto-negotiation module that identifies N speeds to communicate with the remote PHY, wherein N is an integer greater than 1. The first control module selects one of the N speeds based on one of the first and second lengths and links the PHY to the remote PHY at the selected one of the N speeds. The cable comprises first, second, third, and fourth pairs of twisted wires. The first CLM module one of opens, short-circuits and couples a predetermined resistance between at least one of the first and third pairs at the PHY, transmits first test signals on at least one of the second and fourth pairs at a first time, receives first return signals from the remote PHY on at least one of the second and fourth pairs at a second time, and determines the first length based on a difference between the first and second times.

In other features, the cable comprises pairs of twisted wires, and wherein the first CLM module one of opens, short-circuits and couples a predetermined resistance to at least one of the pairs at the PHY, transmits first test signals on another one of the pairs at a first time, receives first return signals from the remote PHY on the another one of the pairs at a second time, and determines the first length based on a difference between the first and second times.

In other features, the cable comprises pairs of twisted wires. The first CLM module one of opens, short-circuits and couples a predetermined resistance to the pairs at the PHY during a first period, transmits first test signals on another at least one of the pairs at a first time during a second period, receives first return signals from the remote PHY on the another one of the pairs during at a second time during the second period, and determines the first length based on a difference between the first and second times. The first period occurs before the second period. The second period occurs before the first period.

A system comprises the PHY device and further comprises the cable and the remote PHY. The remote PHY comprises a second auto-negotiation module that identifies M speeds to communicate with the PHY, wherein M is an integer greater than zero. A second CLM module measures the second length. A second control module receives the first and second lengths, selects one of the M speeds based on one of the first and second lengths, and links the remote PHY to the PHY at the one of the M speeds. The selected one of the N speeds is equal to the selected one of the M speeds.

In other features, a synchronizing module synchronizes measurement of the first and second lengths by the PHY device and the remote PHY device, respectively.

A physical layer (PHY) device of a network device comprises a first module that determines whether a remote PHY that communicates with the PHY device over a cable is capable of measuring a length of the cable, wherein the cable comprises pairs of twisted wires. A first cable-length measuring (CLM) module measures a first length of the cable, one of opens, short-circuits and couples a predetermined resistance to at least one of the pairs at the PHY, transmits first test signals on another one of the pairs at a first time, receives first return signals from the remote PHY on the another one of the pairs at a second time, and determines the first length based on a difference between the first and second times.

In other features, a first control module causes the first length to be transmitted to the remote PHY, receives a second length of the cable measured by the remote PHY, and adjusts an operating parameter of the PHY based on at least one of the first and second lengths. The operating parameter comprises a selected link speed. The first module comprises a first auto-negotiation module that identifies N speeds to communicate with the remote PHY, wherein N is an integer greater than 1. The first control module selects one of the N speeds based on one of the first and second lengths and links the PHY to the remote PHY at the one of the N speeds.

A system comprises the PHY device and further comprises the cable and the remote PHY. The remote PHY comprises a second auto-negotiation module that identifies M speeds to communicate with the PHY, wherein M is an integer greater than zero. A second CLM module measures the second length. A second control module receives the first and second lengths, selects the one of the M speeds based on one of the first and second lengths, and links the remote PHY to the PHY at one of the M speeds. The selected one of the N speeds is equal to the selected one of the M speeds.

A method for operating a physical layer (PHY) device of a network device comprising determining whether a remote PHY that communicates with the PHY device over a cable is capable of measuring a length of the cable; measuring a first length of the cable at the PHY; causing the first length to be transmitted to the remote PHY; receiving a second length of the cable from the remote PHY; and adjusting an operating parameter of the PHY based on at least one of the first and second lengths.

In other features, the operating parameter comprises a selected link speed. The method further includes identifying N speeds to communicate with the remote PHY, wherein N is an integer greater than 1; selecting one of the N speeds based on one of the first and second lengths; and linking the PHY to the remote PHY at the selected one of the N speeds.

In other features, the cable comprises first, second, third, and fourth pairs of twisted wires, and the method further includes one of opening, shorting and coupling a predetermined resistance between at least one of the first and third pairs at the PHY; transmitting first test signals on at least one of the second and fourth pairs at a first time; receiving first return signals from the remote PHY on at least one of the second and fourth pairs at a second time; and determining the first length based on a difference between the first and second times.

In other features, the cable comprises pairs of twisted wires. The method further includes one of opening, shorting and coupling a predetermined resistance to at least one of the pairs at the PHY; transmitting first test signals on another one of the pairs at a first time; receiving first return signals from the remote PHY on the another one of the pairs at a second time; and determining the first length based on a difference between the first and second times.

In other features, the cable comprises pairs of twisted wires. The method further includes one of opening, shorting and coupling a predetermined resistance to the pairs at the PHY during a first period; transmitting first test signals on another at least one of the pairs at a first time during a second period; receiving first return signals from the remote PHY on the another one of the pairs during at a second time during the second period; and determining the first length based on a difference between the first and second times. The first period occurs before the second period. The second period occurs before the first period.

In other features, the method includes identifying M speeds to communicate with the PHY at the remote PHY, wherein M is an integer greater than zero; measuring the second length at the remote PHY; receiving the first and second lengths; selecting one of the M speeds based on one of the first and second lengths; and linking the remote PHY to the PHY at the one of the M speeds, wherein the selected one of the N speeds is equal to the selected one of the M speeds.

In other features, the method includes synchronizing measurement of the first and second lengths by the PHY device and the remote PHY device, respectively.

A method for operating a physical layer (PHY) device of a network device comprises determining whether a remote PHY that communicates with the PHY device over a cable is capable of measuring a length of the cable, wherein the cable comprises pairs of twisted wires; measuring a first length of the cable; one of opening, shorting and coupling a predetermined resistance to at least one of the pairs at the PHY; transmitting first test signals on another one of the pairs at a first time; receiving first return signals from the remote PHY on the another one of the pairs at a second time; and determining the first length based on a difference between the first and second times.

In other features, the method includes causing the first length to be transmitted to the remote PHY; receiving a second length of the cable measured by the remote PHY; and adjusting an operating parameter of the PHY based on at least one of the first and second lengths. The operating parameter comprises a selected link speed.

In other features, the method comprises identifying N speeds to communicate with the remote PHY, wherein N is an integer greater than 1; selecting one of the N speeds based on one of the first and second lengths; and linking the PHY to the remote PHY at the one of the N speeds.

In other features, the method comprises identifying M speeds to communicate with the PHY at the remote PHY, wherein M is an integer greater than zero; measuring the second length at the remote PHY; receiving the first and second lengths; selecting the one of the M speeds based on one of the first and second lengths; and linking the remote PHY to the PHY at one of the M speeds, wherein the selected one of the N speeds is equal to the selected one of the M speeds.

A physical layer (PHY) device of a network device comprises first means for determining whether a remote PHY that communicates with the PHY device over a cable is capable of measuring a length of the cable. First cable-length measuring (CLM) means measures a first length of the cable. First control means causes the first length to be transmitted to the remote PHY, receives a second length of the cable measured by the remote PHY, and adjusts an operating parameter of the PHY based on at least one of the first and second lengths.

In other features, the operating parameter comprises a selected link speed. The first means comprises first autonegotiation means for identifying N speeds to communicate with the remote PHY, wherein N is an integer greater than 1. The first control means selects one of the N speeds based on one of the first and second lengths and links the PHY to the remote PHY at the selected one of the N speeds.

In other features, the cable comprises first, second, third, and fourth pairs of twisted wires. The first CLM means one of opens, short-circuits and couples a predetermined resistance between at least one of the first and third pairs at the PHY, transmits first test signals on at least one of the second and fourth pairs at a first time, receives first return signals from the remote PHY on at least one of the second and fourth pairs at a second time, and determines the first length based on a difference between the first and second times.

In other features, the cable comprises pairs of twisted wires. The first CLM means one of opens, short-circuits and couples a predetermined resistance to at least one of the pairs at the PHY, transmits first test signals on another one of the pairs at a first time, receives first return signals from the remote PHY on the another one of the pairs at a second time, and determines the first length based on a difference between the first and second times.

In other features, the cable comprises pairs of twisted wires. The first CLM means one of opens, short-circuits and couples a predetermined resistance to the pairs at the PHY during a first period, transmits first test signals on another at least one of the pairs at a first time during a second period, receives first return signals from the remote PHY on the another one of the pairs during at a second time during the second period, and determines the first length based on a difference between the first and second times. The first period occurs before the second period. The second period occurs before the first period.

A system comprises the PHY device and further comprises the cable and the remote PHY. The remote PHY comprises second auto-negotiation means for identifying M speeds to communicate with the PHY, wherein M is an integer greater than zero. Second CLM means measures the second length. Second control means receives the first and second lengths, selects one of the M speeds based on one of the first and second lengths, and links the remote PHY to the PHY at the one of the M speeds. The selected one of the N speeds is equal to the selected one of the M speeds.

In other features, synchronizing means synchronizes measurement of the first and second lengths by the PHY device and the remote PHY device, respectively.

A physical layer (PHY) device of a network device comprises first means for determining whether a remote PHY that communicates with the PHY device over a cable is capable of measuring a length of the cable, wherein the cable comprises pairs of twisted wires. First cable-length measuring (CLM) means measures a first length of the cable, one of opens, shorts and couples a predetermined resistance to at least one of the pairs at the PHY, transmits first test signals on another one of the pairs at a first time, receives first return signals from the remote PHY on the another one of the pairs at a second time, and determines the first length based on a difference between the first and second times.

In other features, first control means causes the first length to be transmitted to the remote PHY, receives a second length of the cable measured by the remote PHY, and adjusts an operating parameter of the PHY based on at least one of the first and second lengths. The operating parameter comprises a selected link speed. The first means comprises first autonegotiation means for identifying N speeds to communicate with the remote PHY, wherein N is an integer greater than 1, and wherein the first control means selects one of the N speeds based on one of the first and second lengths and links the PHY to the remote PHY at the one of the N speeds.

A system comprises the PHY device and further comprises the cable and the remote PHY. The remote PHY comprises second auto-negotiation means for identifying M speeds to communicate with the PHY, wherein M is an integer greater than zero. Second CLM means measures the second length. Second control means receives the first and second lengths, selects the one of the M speeds based on one of the first and second lengths, and links the remote PHY to the PHY at one of the M speeds, wherein the selected one of the N speeds is equal to the selected one of the M speeds.

In still other features, the systems and methods described above are implemented by a computer program executed by one or more processors. The computer program can reside on a computer readable medium such as but not limited to memory, non-volatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is not intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A network device generally comprises a physical layer module (PHY) and a medium access controller (MAC). In wired networks, the PHY connects the network device to a cable, and the MAC provides an interface between the PHY and a host (e.g., a computer or other device). The network device can be any type of device that can be connected to a network—e.g., a printer, a computer, a hand-held device, a Voice-over Internet Protocol (VoIP) player, a set top box, a hard disk drive, and the like.

Figure 2:
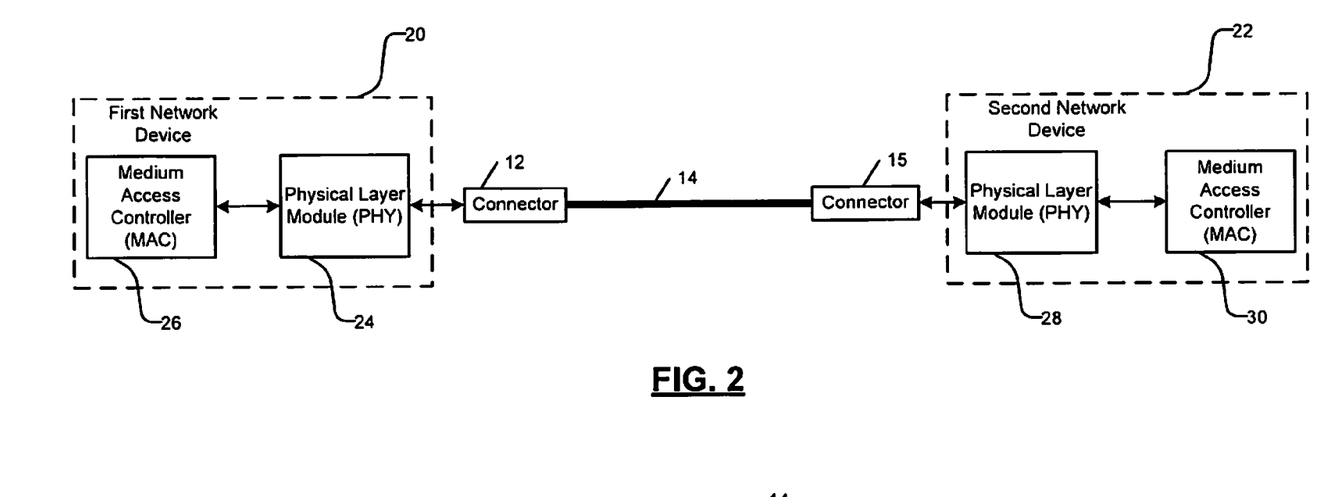
FIG. 2 is a functional block diagram of an exemplary network comprising a first network device communicating with a second network device via a twisted-pair cable.
Figure 3:
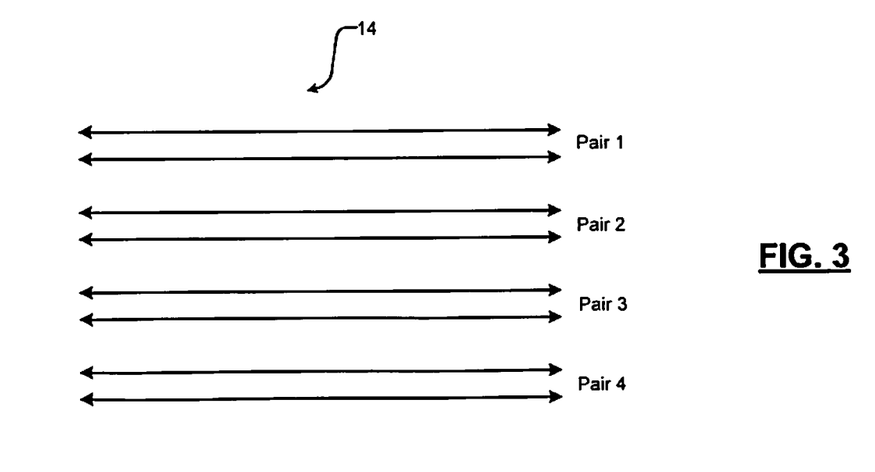
FIG. 3 depicts components of the twisted-pair cable of FIG. 2.

Referring now to FIGS. 2-3, a first network device 20 is connected to a second network device 22 using the cable 14. In one implementation, the first network device 20 comprises a PHY 24 and a MAC 26. The PHY 24 is coupled to the cable 14 via a connector 12. In one implementation, the second network device 22 comprises a PHY 28 and a MAC 30. The PHY 28 is coupled to the cable 14 via a connector 15. The PHY 24 may communicate with the PHY 28 via the cable 14. Generally, the first network device 20 may be called a local device, and the second network device 22 may be called a link partner of the local device, or vice versa.

In an Ethernet-based network, the cable 14 may include a CAT5 or CAT6 twisted-pair cable having eight conductors. The eight conductors may be grouped into four pairs of twisted wire as shown in FIG. 3 (twists not shown). In one implementation, the connectors 12 and 15 are RJ45 connectors. Although the present disclosure refers to CAT5 and CAT6 cables and RJ45 connectors, the systems and methods disclosed herein may be applicable to cables of other categories (e.g., CAT3, CAT7, and the like), cables having more than four pairs of conductors, and other types of connectors (e.g., RJ11, RJ48, RJ49, RJ61, and so on).

Typically, the PHYs 24, 28 may be capable of communicating at different speeds. Additionally, the PHYs 24, 28 may be capable of communicating using different modes (e.g., half-duplex mode and/or full-duplex mode). In one implementation, the PHYs 24, 28 select a particular communication speed and mode by exchanging information regarding communication speed and mode capabilities (e.g., via auto-negotiation) prior to establishing a link between the PHYs 24, 28.

Specifically, (in one implementation) auto-negotiation takes control of the cable 14 when a connection is established between the PHY 24 and the PHY 28. Using auto-negotiation, the PHY 24 may advertise the speeds and the modes in which the PHY 24 can communicate. Additionally, the PHY 24 may detect the speeds and the modes in which the PHY 28 can communicate. Thereafter, auto-negotiation may synchronize the speed and the mode of the PHY 24 and the PHY 28 so that the first network device 20 and the second network device 22 may communicate, e.g., at the fastest possible data transfer rate.

Generally, the speed at which the PHYs 24, 28 can communicate may depend on a length of the cable 14. For example, the PHYs 24, 28 may be able to communicate at higher speeds as the length of the cable 14 is shortened. Accordingly, determining the length of the cable 14 accurately at startup may enable the PHYs 24, 28 to select the fastest speed at which the PHYs 24, 28 can communicate. Specifically, the PHYs 24, 28 may exchange information regarding speed capabilities of each other via auto-negotiation, determine a length of the cable 14, select the fastest speed to communicate based on the cable-length, and establish link between the PHYs 24, 28.

The length of the cable may be used to adjust other operating parameters of the PHY and the remote PHY. For example, the lengths can be used to synchronize events. For example, when transmitting audio to speakers, the lengths of the cable may be used to synchronize the sound with video or sound sent to other speakers or systems. Failure to synchronize may results in latency that may cause a lip sync effect. Alternately, cable lengths may also be indicative of tampering in some systems. For example, when one neighbor replaces a first cable using a second cable having a different length to steal broadband services such as Internet connections, cable content, etc.

In one implementation, cable-lengths are accurately measured by using cable testers that are built into the PHYs (e.g., PHYs 24, 28). In one implementation, the built-in cable testers use time domain reflectometry (TDR) to measure cable-lengths and test cables. Unlike conventional cable testers, the built-in cable testers can accurately measure lengths of cables that are properly terminated (e.g., connected to a PHY at either end). Additionally, (in one implementation) the built-in cable testers may be selectively activated to measure cable-lengths and diagnose cable problems.

Specifically, (in one implementation) the built-in cable testers test cables and measure cable-lengths by performing TDR pair-by-pair on all pairs of a cable. The built-in cable tester transmits multiple pulses over each pair of the cable. For each transmitted pulse, the built-in cable tester receives a reflection or a return pulse from the remote end of the cable or from a point of fault along the length of the cable. The reflections may be averaged. The built-in cable tester analyzes the return pulses and determines cable status such as an open, a short, no fault, etc. Additionally, the built-in cable tester determines a distance from the PHY to a point of fault along the length of the cable and the distance from the PHY to the remote end of the cable (i.e., the length of the cable). The built-in cable testers may also be referred to as cable-length measuring (CLM) modules.

Figure 4:
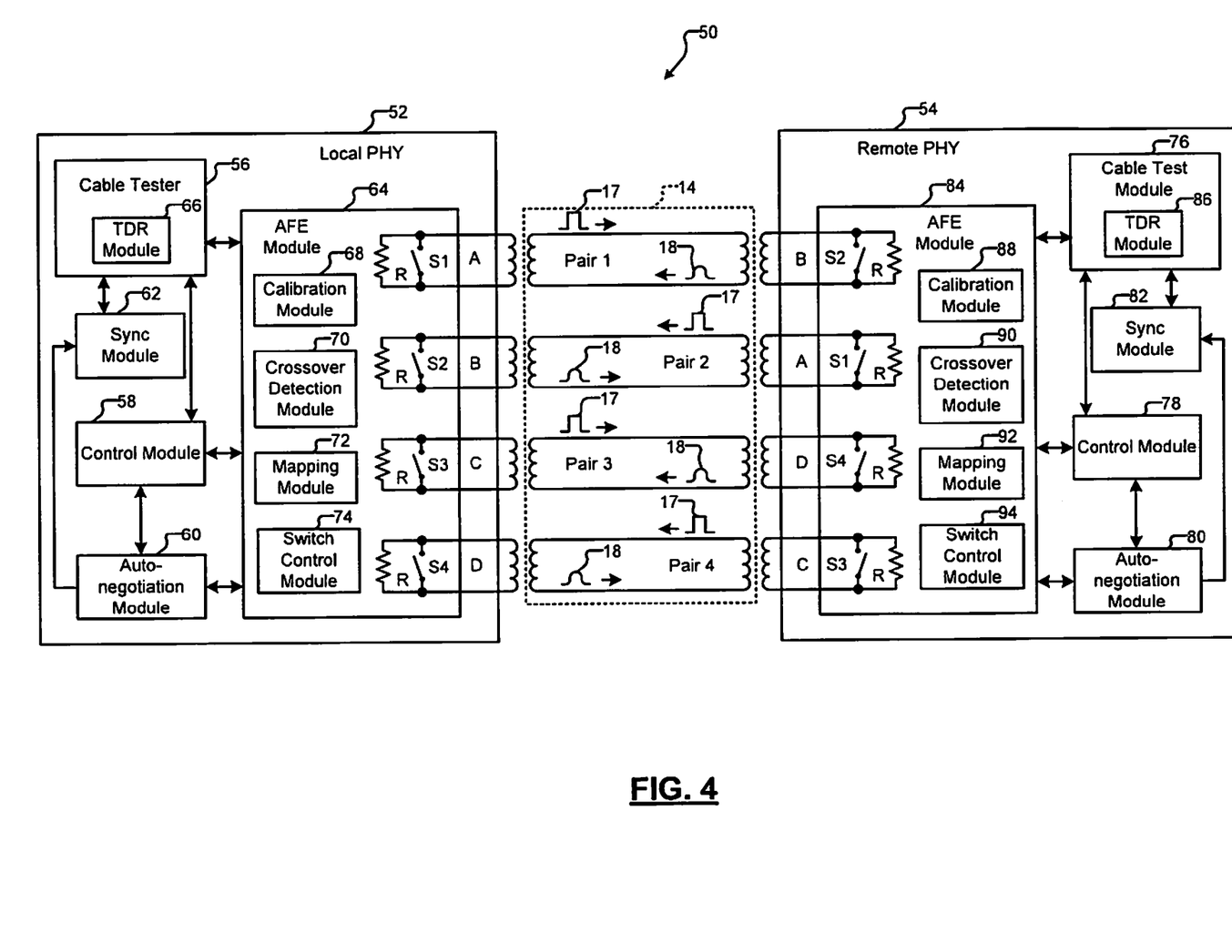
FIG. 4 is a functional block diagram of an exemplary cable-length measuring system using cable testers built into network devices according to one implementation of the present disclosure.

Referring now to FIG. 4, a system 50 for determining the length of a cable (e.g., cable 14) using a built-in cable tester is shown. The cable 14 comprising four pairs of twisted wires connects a (local) PHY 52 of a local network device (not shown) to a (remote) PHY 54 of a remote network device (not shown). The four pairs of twisted wires include pair 1, pair 2, pair 3, and pair 4. Connectors and twists are omitted for simplicity. Hereinafter, the PHY 52 is referred to as the local PHY 52, and the PHY 54 is referred to as the remote PHY 54.

The local PHY 52 comprises a built-in cable tester 56, a control module 58, an auto-negotiation module 60, a synchronization module 62, and an analog front-end (AFE) module 64. In one implementation, the cable tester 56 comprises a TDR module 66 that measures a length of the cable 14. The control module 58 controls the auto-negotiation module 60 and the cable tester 56. Specifically, the control module 58 determines when to auto-negotiate, measure the cable-length, and begin normal operation at startup.

The auto-negotiation module 60 performs auto-negotiation and learns about capabilities of the remote PHY 54. Specifically, the auto-negotiation module 60 determines whether the remote PHY 54 comprises a built-in cable tester that can measure the cable-length. The synchronization module 62 synchronizes cable-length measurements performed by the local PHY 52 and the remote PHY 54.

The AFE module 64 comprises termination resistances R for each pair, a switch across each pair, a calibration module 68, a crossover detection module 70, a mapping module 72, and a switch control module 74. Although switches S1-S4 are shown as mechanical switches for simplicity, the switches S1-S4 may include logical switches that can be opened and closed using control signals. The switch control module 74 controls the positions of the switches S1-S4 based on control signals received from the TDR module 66 and the control module 58.

Specifically, when the switch control module 74 receives a control signal from the TDR module 66 indicating start of a test operation, the switch control module 74 selectively closes each of switches S1-S4 for testing different pairs of the cable 14. On the other hand, when the switch control module 74 receives a control signal from the control module 58 indicating start of normal operation, the switch control module 74 opens each of switches S1-S4 for normal operation.

At startup, the calibration module 68 calibrates the termination resistances R for each pair so that the cable 14 can function as a balanced transmission line. The calibration module 68 stores the calibrated values of the termination resistances R for each pair. The crossover detection module 70 determines whether the local PHY 52 implements a media dependent interface (MDI) port or a MDIX (i.e., MDI crossover) port. MDI ports connect to MDIX ports via straight-through twisted pair cables. MDI-to-MDI and MDIX-to-MDIX connections use crossover twisted pair cables.

Depending on whether the local PHY 52 implements a MDI or MDIX port, the mapping module 72 maps the four pairs of the cable 14 as follows. For MDI, pairs 1, 2, 3, and 4 are mapped to channels A, B, C, and D, respectively. For MDIX, pairs 2, 1, 4, and 3 are mapped to channels A, B, C, and D, respectively. For simplicity, both the local and remote PHYs 52, 54 are presumed to implement either MDI ports or MDIX ports. Accordingly, as an example, the local and remote PHYs 52, 54 may be connected by either MDI-to-MDI or MDIX-to-MDIX crossover twisted pair cable 14.

The remote PHY 54 comprises a built-in cable tester 76, a control module 78, an auto-negotiation module 80, a synchronization module 82, and an AFE module 84. The cable tester 76 comprises a TDR module 86 that measures the length of the cable 14. The AFE module 84 comprises termination resistances R for each pair of the cable 14, a switch across each pair, a calibration module 88, a crossover detection module 90, a mapping module 92, and a switch control module 94. All the modules of the remote PHY 54 perform the functions performed by the corresponding modules of the local PHY 52.

Each of the AFE modules 64, 84 generates a control signal when the calibration and crossover detection is complete. Based on the control signals, the auto-negotiation modules 60, 80 begin auto-negotiation. The auto-negotiation modules 60, 80 determine the capabilities of the remote and the local PHYs 54, 52, respectively. Each of the auto-negotiation modules 60, 80 generates a control signal when the exchange of the capabilities between the remote and the local PHYs 54, 52 is complete. Based on the control signals generated by the auto-negotiation modules 60, 80, each of the control modules 58, 78 enters test mode and generates a control signal that activates the TDR modules 66, 86. The TDR modules 66, 86 measure the cable-length as follows.

The TDR module 66 may generate a control signal based on which the switch control module 74 may close switches S1 and S3 of the AFE module 64 (i.e., short-circuit channels A and C of the local PHY 52). Alternately, the pair can be opened to create an open circuit. Still other methods may include connecting a calibrated resistance across the pair.

The TDR module 66 may measure the cable-length by transmitting test pulses 17 and receiving return pulses 18 on channels B and D of the local PHY 52. Concurrently, the TDR module 86 may generate a control signal based on which the switch control module 94 may close switches S1 and S3 of the AFE module 84 (i.e., short-circuit channels A and C of the remote PHY 54). The TDR module 86 may measure the cable-length by transmitting test pulses 17 and receiving return pulses 18 on channels B and D of the remote PHY 54.

Subsequently, the TDR module 66 may generate a control signal based on which the switch control module 74 may open switches S1 and S3 of the AFE module 64 and close switches S2 and S4 of the AFE module 64. The TDR module 66 may measure the cable-length by transmitting test pulses 17 and receiving return pulses 18 on channels A and C of the local PHY 52. Concurrently, the TDR module 86 may generate a control signal based on which the switch control module 94 may open switches S1 and S3 of the AFE module 84 and close switches S2 and S4 of the AFE module 84. The TDR module 86 may measure the cable-length by transmitting test pulses 17 and receiving return pulses 18 on channels A and C of the remote PHY 54.

Thereafter, the control modules 58, 78 may determine the length of the cable 14 based on the cable-length measurements received from the TDR modules 66, 86. If the cable-lengths measurements differ, the control modules 58, 78 may select the longest of the cable-lengths as the length of the cable 14. Based on the selected cable-length, the control modules 58, 78 may select a speed to communicate (e.g., a data transfer rate between the local PHY 52 and the remote PHY 54). The auto-negotiation modules 60, 80 may exchange the selected speed (or data transfer rate). The control modules 58, 78 may enter normal mode and link the local and remote PHYs 52, 54 at the selected speed.

Figure 5A:
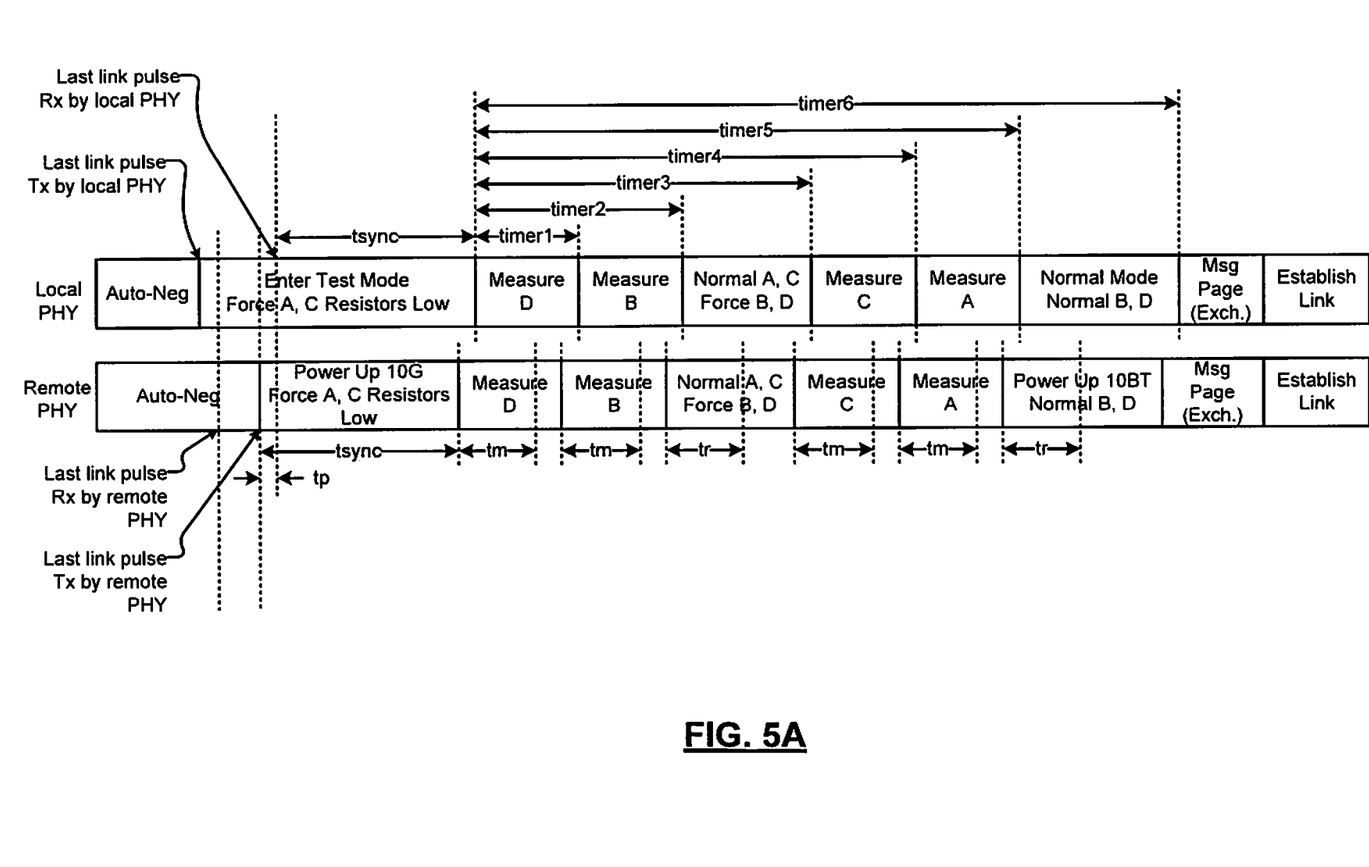
FIG. 5A is a schematic flow diagram showing the steps for measuring a length of a cable according to one implementation of the present disclosure.
Figure 5B:
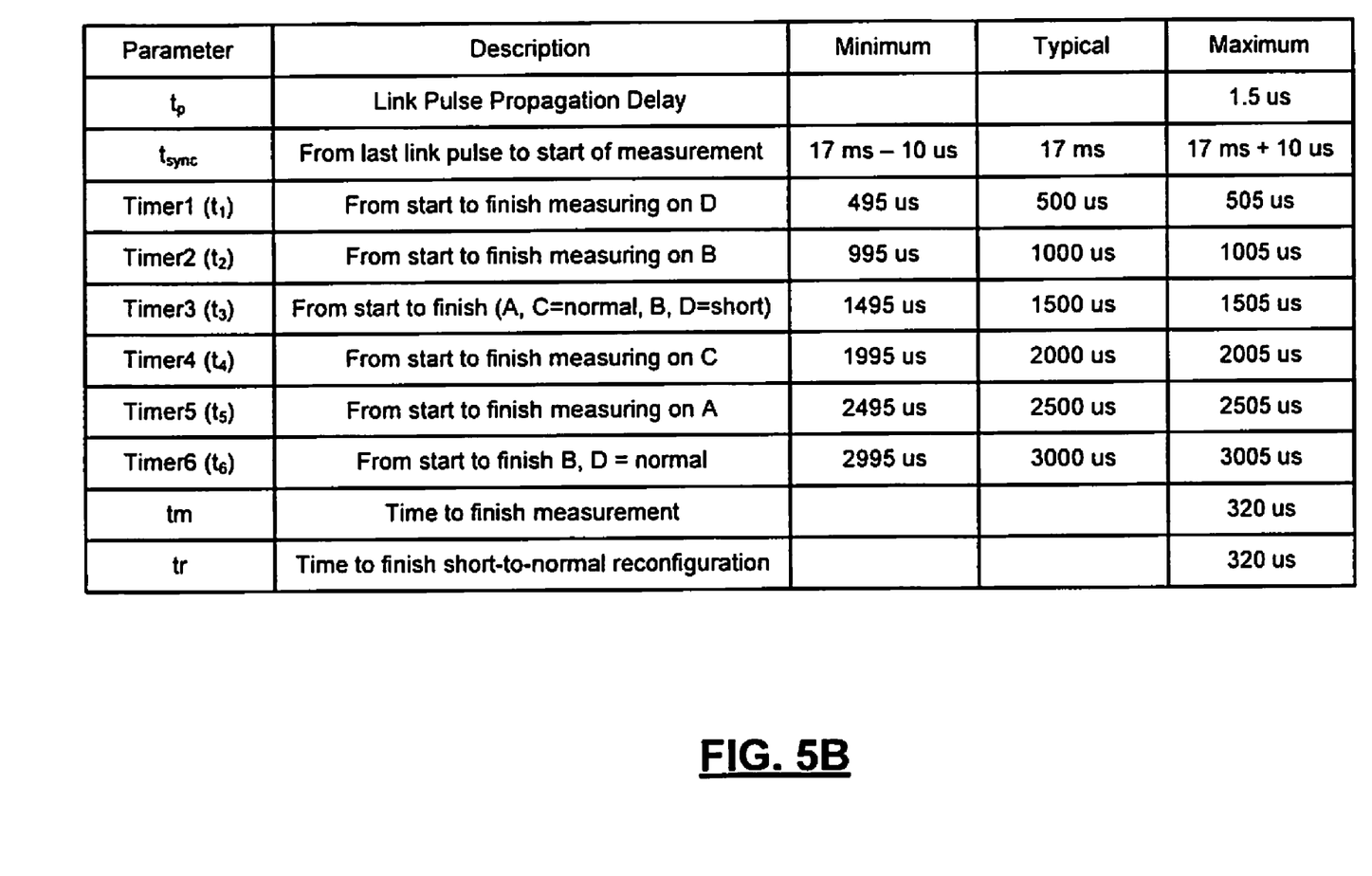
FIG. 5B is a table showing exemplary timings of the steps of FIG. 5A.

Referring now to FIGS. 5A and 5B, the auto-negotiation modules 60, 80 may finish the exchange of capabilities at different times. In FIG. 5A, the synchronization modules 62, 82 synchronize the cable-length measurements performed by the TDR modules 66, 86 so that both the TDR modules 66, 86 can begin measuring the cable-length substantially simultaneously. Each of the synchronization modules 62, 82 may comprise a plurality of timers that ensure that the steps involved in the cable-length measurements are executed in a timely manner (e.g., synchronously).

More specifically, (in one implementation) each of the synchronization modules 62, 82 include a synchronization timer having a duration $t_{sync}$. The synchronization timers of the synchronization modules 62, 82 start when the respective PHYs 52, 54 finish exchanging capabilities (e.g., when the auto-negotiation modules 60, 80 transmit the last link pulse). The synchronization timers are reset (i.e., restarted) every time the auto-negotiation modules 60, 80 detect a link pulse that is received by the respective PHYs 52, 54. For example, the synchronization timer of the local PHY 52 is reset to $t_{sync}$ when the auto-negotiation module 60 detects a link pulse that is received by the local PHY 52. Similarly, the synchronization timer of the remote PHY 54 is reset to $t_{sync}$ when the auto-negotiation module 80 detects a link pulse that is received by the remote PHY 54.

Thus, the synchronization timers of the local and the remote PHY 52, 54 are reset for the last time when a last link pulse is transmitted by one of the local or the remote PHY 52, 54, and the last pulse is received by the other of the local or the remote PHY 52, 54. Thereafter, the synchronization timers of both the local and the remote PHYs 52, 54 expire after counting time $t_{sync}$.

In one implementation, the TDR modules 66, 86 begin measuring cable-lengths after the respective synchronization timers expire. The time when the synchronization timers expire may differ by an amount of time it takes for the last link pulse to travel the cable-length (i.e., by an amount of time equal to a propagation delay $t_p$). The propagation delay $t_p$, however, is negligibly small relative to $t_{sync}$. Accordingly, (in one implementation) the synchronization timers of both the local and the remote PHYs 52, 54 expire practically simultaneously. Subsequently, the TDR module 66, 86 begin measuring the cable-length substantially simultaneously.

The local and remote PHYs 52, 54 initially short-circuit channels A and C of the respective PHYs 52, 54. The local and remote PHYs 52, 54 begin measuring the cable-length by transmitting test pulses 17 and receiving return pulses 18 first on channels B and D of the respective PHYs 52, 54. Accordingly, when the local PHY 52 transmits test pulses 17 on channels B and D of the local PHY 52, the test pulses 17 are transmitted on and returned by the channels A and C of the remote PHY 54 that are shorted by the remote PHY 54, respectively. Additionally, when the remote PHY 54 transmits test pulses 17 on channels B and D of the remote PHY 54, the test pulses 17 are transmitted on and returned by the channels A and C of the local PHY 52 that are shorted by the local PHY 52, respectively.

Subsequently, the local and remote PHYs 52, 54 open the channels A and C and short-circuit the channels B and D of the respective PHYs 52, 54. The local and remote PHYs 52, 54 begin measuring the cable-length by transmitting test pulses 17 and receiving return pulses 18 first on channels A and C of the respective PHYs 52, 54. Accordingly, when the local PHY 52 transmits test pulses 17 on channels A and C of the local PHY 52, the test pulses 17 are transmitted on and returned by the channels B and D of the remote PHY 54 that are shorted by the remote PHY 54, respectively. Additionally, when the remote PHY 54 transmits test pulses 17 on channels A and C of the remote PHY 54, the test pulses 17 are transmitted on and returned by the channels B and D of the local PHY 52 that are shorted by the local PHY 52, respectively.

Each of the synchronization modules 62, 82 may include six additional timers timer1, timer2, . . . , and timer6 of duration $t_1, t_2, \ldots,$ and $t_6$, respectively. $t_1 < t_2 < t_3 < t_4 < t_5 < t_6$. The timers timer1-timer6 start when the synchronization timers of the respective synchronization modules 62, 82 expire. As an example only, after closing switches S1, S3 on channels A and C of the local and the remote PHYs 52, 54, the TDR modules 66, 86 may measure the cable-length in six steps as follows.

First, the TDR modules 66, 86 may measure the cable-length by transmitting test pulses 17 and receiving return pulses 18 on channel D (or B) of the respective PHY 52, 54. Time duration $t_1$ is the time taken from expiration of $t_{sync}$ to completion of cable-length measurement on channel D (or B). Next, the TDR modules 66, 86 may measure the cable-length by transmitting test pulses 17 and receiving return pulses 18 on channel B (or D) of the respective PHY 52, 54. Time duration $t_2$ is the time taken from expiration of $t_{sync}$ to completion of cable-length measurement on channel B (or D). Next, the switch control modules 74, 94 may close switches S2, S4 on the channels B and D and open switches S1, S3 on the channels A and C—i.e., to normalize the channels A and C—of the respective PHYs 52, 54. Time duration $t_3$ is the time taken from expiration of $t_{sync}$ to completion of normalizing channels A and C and shorting channels B and D.

Next, the TDR modules 66, 86 measure the cable-length by transmitting test pulses 17 and receiving return pulses 18 on channel C (or A) of the respective PHY 52, 54. Time duration $t_4$ is the time taken from expiration of $t_{sync}$ to completion of cable-length measurement on channel C (or A). Next, the TDR modules 66, 86 measure the cable-length by transmitting test pulses 17 and receiving return pulses 18 on channel A (or C) of the respective PHY 52, 54. Time duration $t_5$ is the time taken from expiration of $t_{sync}$ to completion of cable-length measurement on channel A (or C). Next, the switch control modules 74, 94 may open switches S2, S4 on channels B and D—i.e., to normalize the channels B and D—of the respective PHYs 52, 54. Time duration $t_6$ is the time taken from expiration of $t_{sync}$ to completion of normalizing channels B and D.

Alternatively, the TDR modules 66, 86 may measure the cable-length by using both channels simultaneously instead of using one channel at a time. For example, instead of first using channel B (or D) followed by channel D (or B), channels B and D may be used simultaneously. Similarly, instead of first using channel A (or C) followed by channel C (or A), channels A and C may be used simultaneously. Simultaneous use of channels, however, may generate cross-talk between the channels in some applications.

In FIG. 5B, exemplary minimum, typical, and maximum values of durations of timers $t_{sync}, t_1, \ldots,$ and $t_6$ are shown. Although six timers are used as an example, a single timer of duration $t_6$ may be used from the expiration of $t_{sync}$ to $t_{sync}$ the end of the sixth step instead of using the six timers. Alternatively, a single timer of duration $t_1$ may be used from the expiration of $t_{sync}$ and may be restarted at the end of each of the six steps.

Figure 6:
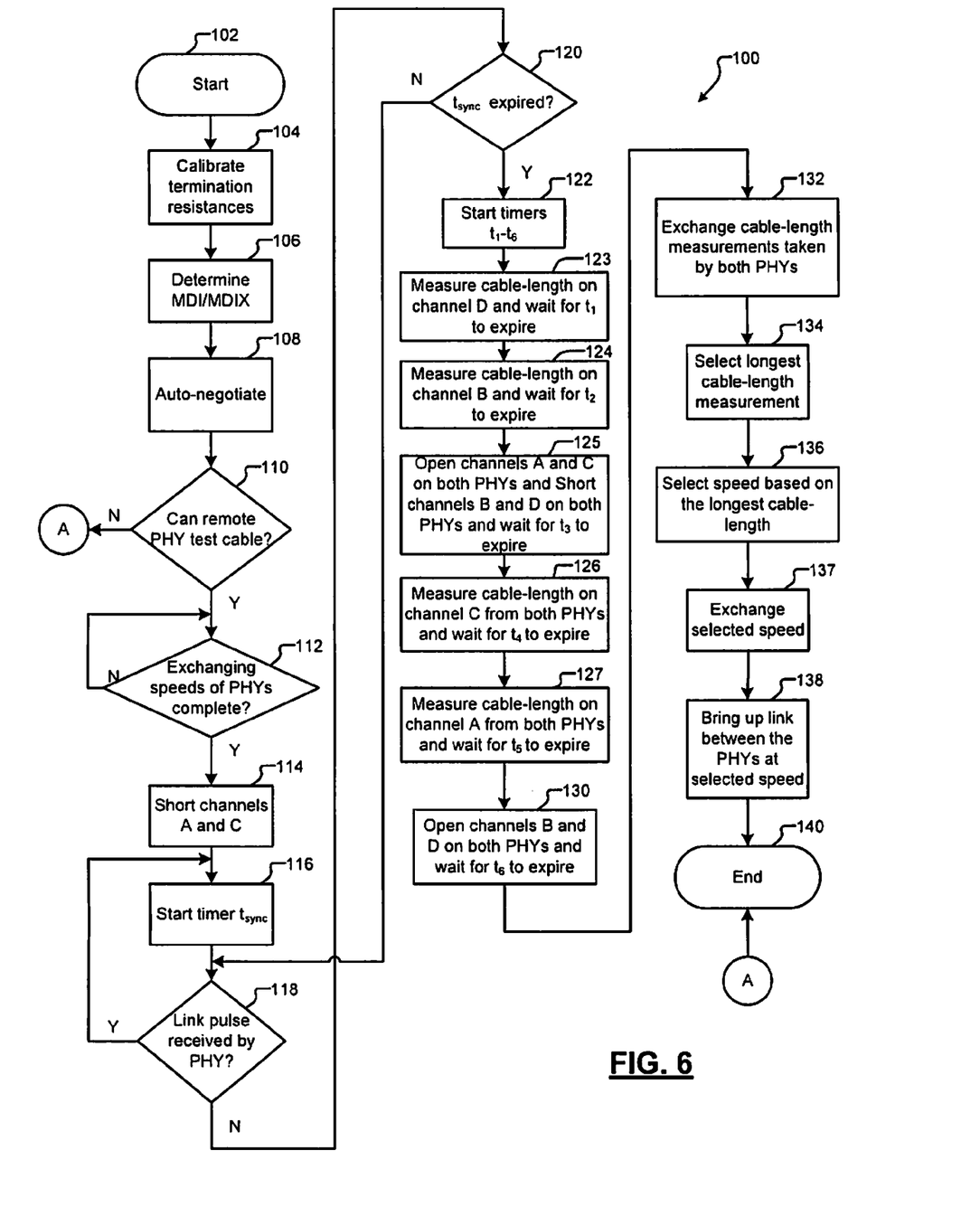
FIG. 6 is a flowchart of a method for measuring a length of a cable using cable testers built into network devices according to one implementation of the present disclosure.

Referring now to FIG. 6, a method 100 for measuring a length of a cable, e.g., at startup is shown. The method 100 begins at step 102. The calibration modules 68, 88 calibrate the termination resistances R in step 104. The crossover detection modules 70, 90 determine in step 106 whether the local and remote PHYs 52, 54 implement MDI or MDIX ports. More generally, other types of Ethernet ports can be implemented within a PHY depending upon a type of connector and/or type of cable being implemented within a network. The Auto-negotiation modules 60, 80 begin auto-negotiating in step 108.

Based on the information obtained by the auto-negotiation modules 60, 80, the control modules 58, 78 determine in step 110 whether the local and remote PHYs 52, 54 can measure the cable-length. If the result of step 110 is false, the method 100 ends in step 140. If the result of step 110 is true, the control modules 58, 78 determine in step 112 whether exchanging speeds (or data transfer rates) of the respective PHYs 52, 54 is complete. If the result of step 112 is false, the method 100 repeats step 112. If the result of step 112 is true, the switch control modules 74, 94 close switches S1, S3 and short-circuit channels A and C of the respective PHYs 52, 54 in step 114. The synchronization modules 62, 82 start the synchronization timer $t_{sync}$ of the respective PHYs 52, 54 in step 116.

The auto-negotiation modules 60, 80 determine in step 118 whether a link pulse is received by the local or the remote PHY 52, 54, respectively. If the result of step 118 is true, the synchronization timer $t_{sync}$ of the PHY that received the link pulse is reset by repeating step 116. If the result of step 118 is false, the control modules 58, 78 determine in step 120 whether the synchronization timers $t_{sync}$ expired, respectively. If the result of step 120 is false, the method 100 returns to step 118. If the result of step 120 is true, the synchronization modules 62, 82 start the timers $t_1$-$t_6$ in step 122.

The TDR modules 66, 86 measure the cable-length in step 123 by transmitting test pulses 17 and receiving return pulses 18 on channel D and then waiting for $t_1$ to expire. The TDR modules 66, 86 measure the cable-length in step 124 by transmitting test pulses 17 and receiving return pulses 18 on channel B and then waits for $t_2$ to expire.

The switch control modules 74, 94 open switches S1, S3, close switches S2, S4, and short-circuit channels A and C of the respective PHYs 52, 54 and then wait for timer $t_3$ to expire in step 125. The TDR modules 66, 86 measure the cable-length in step 126 by transmitting test pulses 17 and receiving return pulses 18 on channel C of the respective PHYs 52, 54 and then wait for the timer $t_4$ to expire. The TDR modules 66, 86 measure the cable-length in step 126 by transmitting test pulses 17 and receiving return pulses 18 on channel A of the respective PHYs 52, 54 and then wait for the timer $t_5$ to expire. The switch control modules 74, 94 open switches S2, S4 of the respective PHYs 52, 54 and then wait for timer $t_6$ to expire in step 130.

The control modules 58, 78 exchange the cable-lengths measured by the TDR modules 66, 86 in step 132. In one implementation, the control modules 58, 78 select the longest of the cable-lengths as the length of the cable 14 in step 134. The control modules 58, 78 select the speed of communication based on the selected cable-length in step 136. The auto-negotiation modules 60, 80 exchange the selected speed in step 137. The control modules 58, 78 enter normal mode and bring up the link between the local and the remote PHYs 52, 54 in step 138. The method 100 ends in step 140.

It is not necessary to exchange the length information in some cases. For example when detecting stolen cable TV, a one way measurement may be sufficient. In other words, a PHY device of the distribution box measures the distance to a client PHY device. The client PHY device does not need to make any measurements but will cooperate with the PHY of the distribution box.

While the PHYs may coordinate and selective short circuit and measure pairs, an alternative implementation may open a termination resistor in FIG. 4 instead of shorting it. In addition, since resistors can be calibrated, the calibrated value to the resistance may be changed to a value that out of calibration range to create a reflection.

While cable testing is described as operating on pairs (such as first/third and then second/fourth pairs), the pairs may be handled one at a time. Alternatively, all of the pairs of one of the PHYs can shorted (or opened or terminated with the out of range resistance) and then this approach is repeated at the remote PHY. While this approach is not symmetrical, the autonegotiation modules of the PHYs can select a master and a slave. The selected master may go first.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A physical layer (PHY) device of a network device, the PHY device comprising:
    a first module configured to determine whether a remote PHY that communicates with said PHY device over a cable is capable of measuring a length of said cable;
    a first cable-length measuring (CLM) module configured to perform a first measurement of said length of said cable; and
    a first control module, wherein in response to said remote PHY being capable of measuring said length of said cable, said first control module is configured to
        cause said first measurement of said length of said cable to be transmitted to said remote PHY,
        receive a second measurement of said length of said cable as measured by said remote PHY, and
        adjust an operating parameter of said PHY based on at least one of said first measurement and said second measurement.

2. The PHY device of claim 1, wherein said operating parameter comprises a selected link speed.

3. The PHY device of claim 1, wherein said first module comprises a first autonegotiation module that identifies N speeds to communicate with said remote PHY, wherein N is an integer greater than 1, and wherein said first control module (i) selects one of said N speeds based on one of said first and second measurements and (ii) links said PHY to said remote PHY at said selected one of said N speeds.

4. A system comprising:
    the PHY device of claim 3;
    said cable; and
    said remote PHY, wherein said remote PHY comprises:
        a second auto-negotiation module that identifies M speeds to communicate with said PHY, wherein M is an integer greater than zero;
        a second CLM module configured to perform said second measurement of said length of said cable; and
        a second control module configured to (i) select one of said M speeds based on at least one of said first and second measurements, and (ii) link said remote PHY to said PHY at said one of said M speeds, wherein said selected one of said N speeds is equal to said selected one of said M speeds.

5. The PHY device of claim 1, wherein said cable comprises first, second, third, and fourth pairs of twisted wires, and wherein said first CLM module
    one of opens, short-circuits, and couples a predetermined resistance between one of said first and third pairs at said PHY, transmits first test signals on at least one of said second and fourth pairs at a first time, receives first return signals from said remote PHY on at least one of said second and fourth pairs at a second time, and determines said length of said cable based on a difference between said first and second times.

6. The PHY device of claim 1, wherein said cable comprises pairs of twisted wires, and wherein said first CLM module one of opens, short-circuits and couples a predetermined resistance to one of said pairs at said PHY, transmits first test signals on another one of said pairs at a first time, receives first return signals from said remote PHY on said another one of said pairs at a second time, and determines said length of said cable based on a difference between said first and second times.

7. The PHY device of claim 1, wherein said cable comprises pairs of twisted wires, and wherein said first CLM module one of opens, short-circuits and couples a predetermined resistance to said pairs at said PHY during a first period, transmits first test signals on another at least one of said pairs at a first time during a second period, receives first return signals from said remote PHY on said another one of said pairs during at a second time during said second period, and determines said length of said cable based on a difference between said first and second times.

8. The PHY device of claim 7, wherein said first period occurs before said second period.

9. The PHY device of claim 7, wherein said second period occurs before said first period.

10. The PHY device of claim 1, further comprising a synchronizing module configured to synchronize said first measurement and said second measurement.

* * * * *